United States Patent
Tsirkin et al.

(10) Patent No.: US 9,652,296 B1
(45) Date of Patent: May 16, 2017

(54) EFFICIENT CHAINED POST-COPY VIRTUAL MACHINE MIGRATION

(71) Applicant: Red Hat Israel, Ltd., Ra'anana (IL)

(72) Inventors: Michael Tsirkin, Yokneam Illit (IL); David Alan Gilbert, Manchester (GB)

(73) Assignee: Red Hat Israel, Ltd., Ra'Anana (IL)

(*) Notice: Subject to any disclaimer, the term of this patent is extended or adjusted under 35 U.S.C. 154(b) by 0 days.

(21) Appl. No.: 14/941,071

(22) Filed: Nov. 13, 2015

(51) Int. Cl.
| | |
|---|---|
| *G06F 12/10* | (2016.01) |
| *G06F 9/50* | (2006.01) |
| *G06F 12/1009* | (2016.01) |
| *G06F 3/06* | (2006.01) |
| *G06F 11/30* | (2006.01) |
| *G06F 9/455* | (2006.01) |
| *G06F 11/14* | (2006.01) |

(52) U.S. Cl.
CPC ............ *G06F 9/5088* (2013.01); *G06F 3/065* (2013.01); *G06F 3/067* (2013.01); *G06F 3/0619* (2013.01); *G06F 9/45545* (2013.01); *G06F 9/45558* (2013.01); *G06F 11/1484* (2013.01); *G06F 11/301* (2013.01); *G06F 12/1009* (2013.01); *G06F 2009/4557* (2013.01); *G06F 2009/45562* (2013.01); *G06F 2009/45583* (2013.01); *G06F 2212/69* (2013.01)

(58) Field of Classification Search
CPC .... G06F 9/5088; G06F 9/45545; G06F 3/065; G06F 3/0619; G06F 3/067; G06F 11/301; G06F 12/1009; G06F 9/45558; G06F 11/1484; G06F 2212/69; G06F 2009/45562; G06F 2009/4557; G06F 2009/45583
See application file for complete search history.

(56) References Cited

U.S. PATENT DOCUMENTS

| | | |
|---|---|---|
| 7,904,540 B2 | 3/2011 | Hadad et al. |
| 8,473,557 B2 | 6/2013 | Ramakrishnan et al. |
| 8,751,738 B2 | 6/2014 | Green et al. |
| 8,819,678 B2 | 8/2014 | Tsirkin |
| 8,924,930 B2 | 12/2014 | Fries |

(Continued)

OTHER PUBLICATIONS

Deshpande et al., "Traffic-Sensitive Live Migration of Virtual Machines", Binghamton University, Binghamton, NY; Argonne National Lab, Lemont, IL, excerpt from http://www.nimbusproject.org/files/Deshpande_CCGrid15.pdf (10 pages).

(Continued)

*Primary Examiner* — John A Lane
(74) *Attorney, Agent, or Firm* — K&L Gates LLP

(57) ABSTRACT

A hypervisor receives, from a second host at a third host, at a second time after a first time, a first plurality pages. The first plurality of pages were copied at the first time, from a first host to the second host. The hypervisor receives a mapping at the third host, sent from the second host. The mapping indicates a first location of a second plurality of pages and a second location of a third plurality of pages. The hypervisor detects a page fault at the third host. The page fault is associated with a required page that is absent from the third host. Responsive to detecting this, the hypervisor queries the mapping, to determine a source location of the required page and identifies a source host for the source location. The hypervisor receives the required page, from the source host at the third host.

20 Claims, 6 Drawing Sheets

(56) References Cited

U.S. PATENT DOCUMENTS

| | | | |
|---|---|---|---|
| 9,197,489 B1* | 11/2015 | Vincent | H04L 67/148 |
| 2013/0097296 A1 | 4/2013 | Gehrmann et al. | |
| 2014/0208049 A1 | 7/2014 | Furusawa et al. | |
| 2015/0039717 A1* | 2/2015 | Chiu | H04L 67/2842 709/214 |
| 2015/0052322 A1* | 2/2015 | Tsirkin | G06F 12/10 711/162 |
| 2015/0052323 A1* | 2/2015 | Noel | G06F 12/00 711/162 |
| 2015/0212839 A1* | 7/2015 | Tsirkin | G06F 3/0647 711/161 |

OTHER PUBLICATIONS

Elmroth et al., "Interfaces for Placement, Migration, and Monitoring of Virtual Machines in Federated Clouds", Department of Computing Science Umea University, Umea, Sweden, excerpt from https://s3-ap-southeast-1.amazonaws.com/erbuc/files/21872e97-2b91-4c0c-a2f8-3cac818b46e7.pdf (8 pages).

Knut et al., "Open Data Center Alliance Usage Model: Long-Distance Migration Rev. 2.0", 2012-2013, BMW; T-Systems International GMBH; Intel IT SUSE; Intel IT; Fujitsu; ODCA Infra Workgroup; Red Hat; Deutsche Bank; Fujitsu Atos; Science Logic; Bank Leumi; Deutsche Telekom; Intel IT; Atos; Telstra; Capgemini; Lockheed Martin, excerpt from http://www.opendatacenteralliance.org/docs/Long_Distance_Migration_Rev2.0.pdf (27 pages).

Young, Re: [Libvirt-Users] [Libvirt] Vm Live Storage Migration with Snapshots, Feb. 11, 2015, excerpt from https://www.redhat.com/archives/libvirt-users/2015-February/msg00030.html (27 pages).

* cited by examiner

EFFICIENT CHAINED POST-COPY VIRTUAL MACHINE MIGRATION

BACKGROUND

The present disclosure relates generally to memory management of virtual machines, and more particularly to efficient chained post-copy virtual machine migration. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and system for efficient chained post-copy virtual machine migration. For example, the method includes receiving, from a second host at a third host, at a second time after a first time, a first plurality pages of a virtual machine. The first plurality of pages of the virtual machine were copied at the first time from a first host to the second host. A hypervisor receives a mapping at the third host, sent from the second host. The mapping indicates a first location of a second plurality of pages of the virtual machine and a second location of a third plurality of pages of the virtual machine. The hypervisor detects a page fault at the third host. The page fault is associated with a required page that is absent from the third host. Responsive to detecting a page fault, the hypervisor queries the mapping, to determine a source location of the required page, and identifies a source host for the source location. The hypervisor then receives the required page, from the source host at the third host.

Additional features and advantages of the disclosed method and apparatus are described in, and will be apparent from, the following Detailed Description and the Figures.

DETAILED DESCRIPTION OF EXAMPLE EMBODIMENTS

Figure 1:
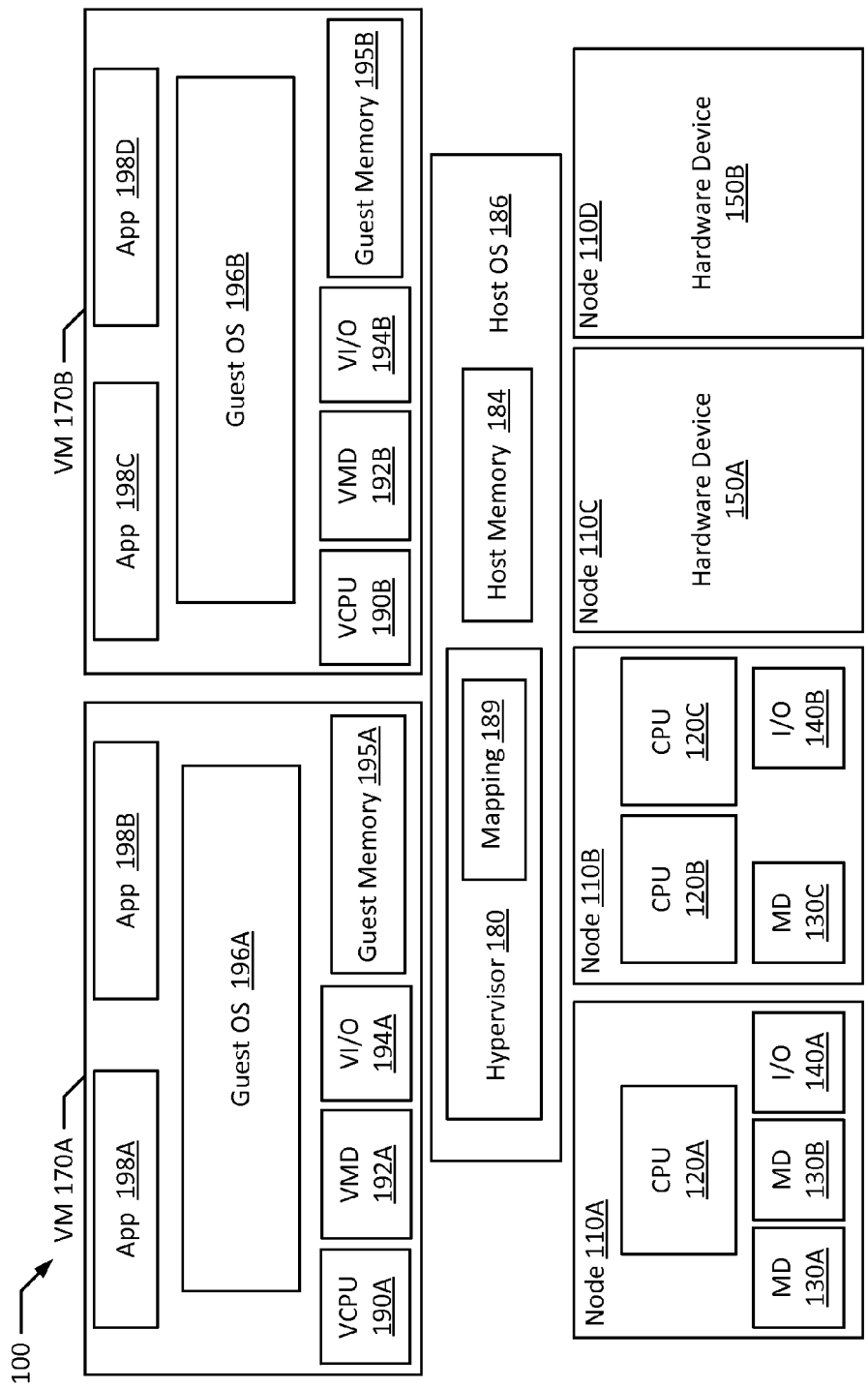
FIG. 1 is a block diagram of an example multiprocessor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device (e.g., 150A-B). In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, such as a point-to-point processor interconnect. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 (or host) executed by the computer system 100. In another example embodiment, the hypervisor 180 may be provided by an application running on the host operating system 186, or may run directly on the computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-B may execute a guest operating system 196A-B which may utilize the underlying VCPU 190A-B, VMD 192A-B, and VI/O devices 194A-B. One or more applications 198A-D may be running on a virtual machine 170A-B under the guest operating system 196A-B. In an example embodiment, a virtual machine 170A-B may include multiple virtual processors (VCPU) 190A-B. Processor virtualization may be implemented by the hypervisor 180 scheduling time slots on one or more physical processors 120A-C such that from the guest operating system's perspective those time slots are scheduled on a virtual processor 190A-B.

The hypervisor 180 manages host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. Guest memory 195A-B allocated to the guest OS 196A-B are mapped from host memory 184 such that when a guest application 198A-D uses or accesses a memory page of guest memory 195A-B it is actually using or accessing host memory 184.

A virtual machine 170A-B may be migrated between host computers, for example, across computer systems. For example, migration can be performed within one multi-processor computer system (e.g., system 100). Likewise, migration can be performed across a number of distinct and separate host computers (or hosts). For example, the mapping 189 may map addresses from one multi-processor computer system (e.g., system 100) to addresses from another multi-processor computer system (e.g., during a virtual machine migration from one host to another host). The mapping 189 to memory is accessible by the hypervisor 180. Moreover, the mapping 189 maps a first host address in a first host to a second host address in a second host when the hypervisor 180 sends the mapping 189 from one host to another host. The mapping process for memory, including interaction and use by hypervisors, is described in greater detail with reference to FIGS. 3, 4A and 4B.

Figure 2:
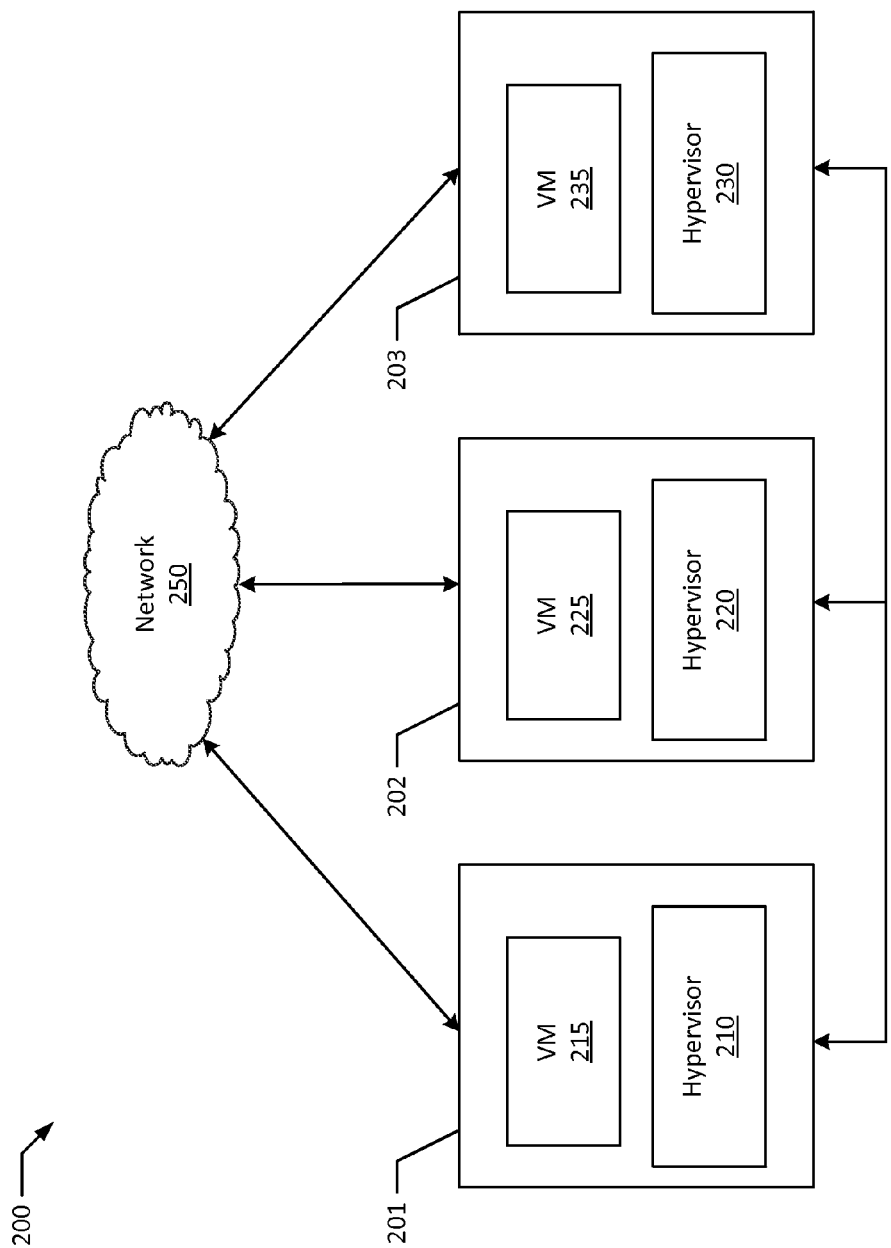
FIG. 2 is a block diagram of an example multi-host computer system according to an example embodiment of the present disclosure.

FIG. 2 illustrates a block diagram of an example multi-host computer system according to an example embodiment of the present disclosure. The system 200 includes a number of distinct and separate host computers, including a first host 201, a second host 202, and a third host 203. The first host 201 includes a first virtual machine 215 and a first hypervisor 210. The second host 202 includes a second virtual machine 225 and a second hypervisor 220. The third host 203 includes a third virtual machine 235 and a third hypervisor 230. Each of the first host 201, the second host 202, and the third host 203 may include additional components, nodes, virtual machines, etc., as illustrated, for example, by system 100 in FIG. 1.

Each of the first host 201, the second host 202, and the third host 203 are in communication with one another. In this way, pages may be copied between the first host 201, the second host 202, and the third host 203. For example, the pages may be copied during a migration of a running virtual machine (e.g., 170A), from one host (e.g., the first host 201) to another host (e.g., the second host 202), such that the migration includes movement of the contents of the running virtual machine (e.g., guest memory 195A), which must be copied from one host (e.g., the first host 201) to another host (e.g., the second host 202). For example, migrating a virtual machine between hosts may be done for purposes of maintenance or load balancing. Similarly, for example, before a first migration of a virtual machine between a first host 201 and a second host 202 is completed (e.g., during load balancing), the virtual machine may need to be migrated to a third host 203. The migration may include sending the mapping 189 between the first host 201, the second host 202, and the third host 203. In an example embodiment, the first host 201, the second host 202, and the third host 203 are connected to one another through a network 250 (e.g., the Internet). In a different example embodiment, the first host 201, the second host 202, and the third host 203 are connected to one another through a local area network (e.g., an Ethernet-based network).

Figure 3:
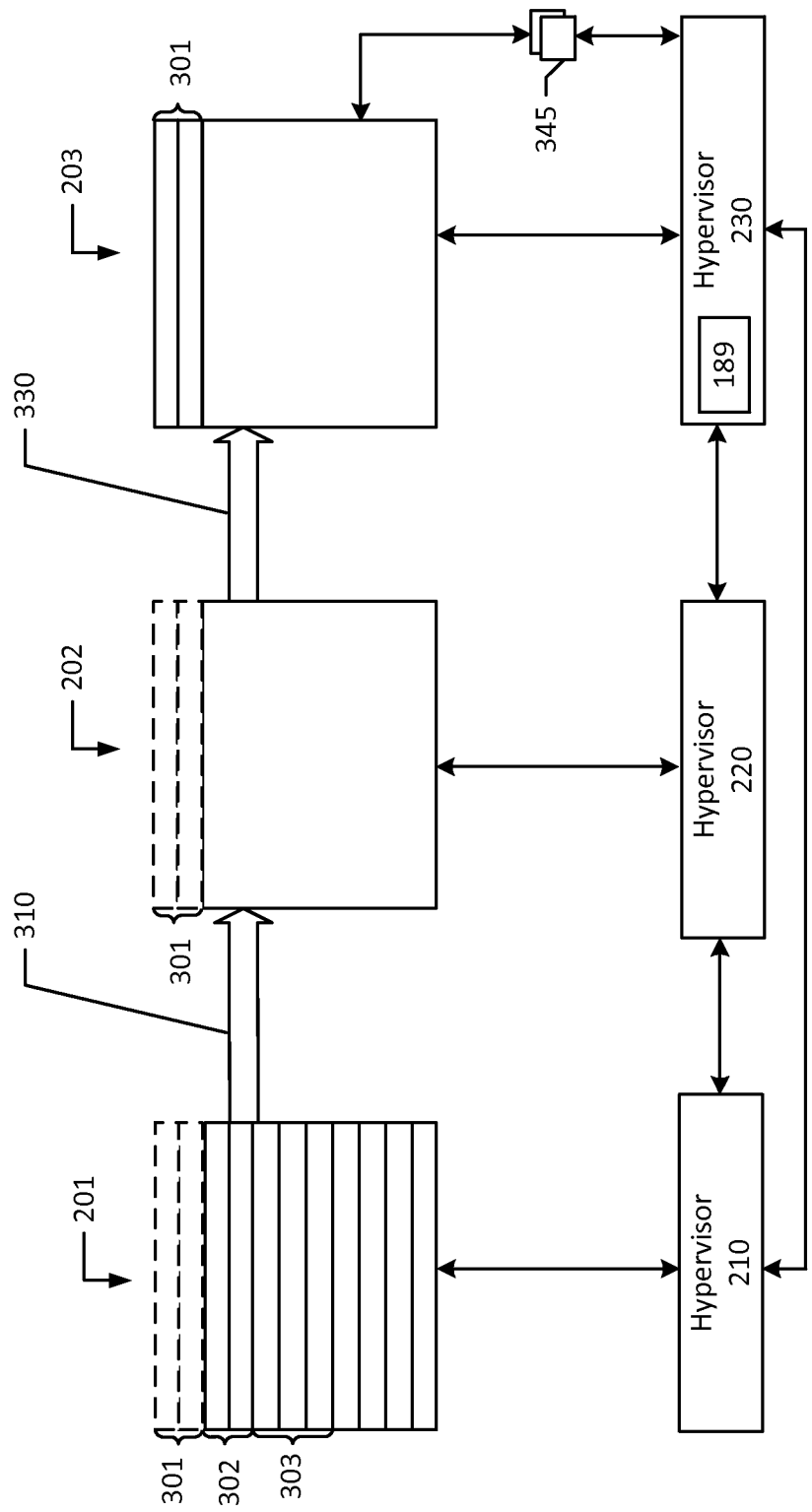
FIG. 3 illustrates a block diagram of a chained virtual machine migration from a first host to a third host according to an example embodiment of the present disclosure.

FIG. 3 illustrates a block diagram of a chained virtual machine migration from a first host to a third host according to an example embodiment of the present disclosure. The first host 201, the second host 202, and the third host 203, may be provided as three physically separate computers. In this way, each of the first host 201, the second host 202, and the third host 203 has a separate hypervisor (e.g., a first hypervisor 210, a second hypervisor 220, and a third hypervisor 230). Each hypervisor (e.g., the second hypervisor 220) may be used to copy pages to a respective host (e.g., the second host 202). For example, the second hypervisor 220 requests pages from the first hypervisor 210 and copies those requested pages onto the second host 201, in cooperation with the first hypervisor 210. Each of the first host 201, the second host 202, and the third host 203 can have a plurality of pages, which are stored on the first host 201, the second host 202, and the third host 203 respectively. For example, a first plurality of pages 301 of the first host 201 (e.g., pages of the virtual machine 215) have been copied at a first time 310 (as noted by the dotted lines at the first host 201), to the second host 202. For example, the first hypervisor 210 in cooperation with the second hypervisor 220 transfers the first plurality of pages 301 to the second host 202. Also, the first plurality of pages 301 of the second host 202 have been copied at a second time 330, after the first time 310, (as noted by the dotted lines at the second host 202), to the third host 203 (as noted by the solid lines). For example, the second hypervisor 220 in cooperation with the third hypervisor 230 transfers the first plurality of pages 301 to the third host 203. The remaining pages present on the first host 201 (e.g., a second plurality of pages 302, a third plurality of pages 303, etc.) may not yet been copied (as noted by the solid lines at the first host 201).

In an example embodiment, the first plurality of pages 301 copied to the third host 203 are an initial copying, such that all hypervisor copying and storing between hosts, after this initial copying, may be characterized herein as post-copy migration. In an example embodiment, because copying at the first time 310 from the first host 201 to the second host 202 precedes copying at the second time 330 from the second host 202 to the third host 203, the entire migration process (e.g., copying from the first host 201 to the second host 202 to the third host 203) may be characterized as chained migration. Chained migration may add additional and potentially significant delay, or latency, if the third host 203 is waiting for pages from the first host 201. For example, if the third host 203 needs a required page from the first host 201, the third host could have to wait for the required page to be copied from the first host 201 to the second host 202, before the required page can be copied from the second host 202 to the third host 203. To mitigate this unnecessary delay, copying in a chained migration scenario can be optimized through the use of the mapping 189.

In addition to receiving the first plurality of pages 301 at the third host 203, the third host 203 receives a mapping 189, sent from the second host 202. The mapping 189 indicates a first location of the second plurality of pages 302 and a second location of the third plurality of pages 303. For example, and as shown in FIG. 3, the first location and the second location are both at the first host 201. Alternatively, the first location could be at the second host 202, the second location could be at the first host 201, or both the first location and the second location could be at the second host 202. Typically, the mapping will also indicate the location of a number of additional pages, including a number of additional locations for each of the respective additional pages.

With post-copy migration, certain pages (e.g., the first plurality of pages 301) have already been copied to the third host 203. However, additional pages, beyond the first plurality of pages 301, may be required at the third host 203. A required page can be one single page (e.g., a single page in the second plurality of pages 302), or more than one page (e.g., a portion of the second plurality of pages 302, the second plurality of pages 302, the third plurality of pages 303, etc.).

The third hypervisor 230 detects a page fault 345 at the third host 203, the page fault 345 being associated with a required page that is absent from the third host 203. In an example embodiment, the page fault 345 is generated in response to an attempt to access, on the third host 203, at least one byte of the required page. Responsive to detecting the page fault 345, the third hypervisor 230 queries the mapping 189, to determine a source location of the required page. The third hypervisor 230 identifies a source host for the source location. For example, if the required page is on the first host 201, the first host 201 is the source host identified by the third hypervisor 230. By comparison, if the required page is on the second host 202, the second host 202 is the source host identified by the third hypervisor 230. The required page is then copied from the source host to the third host 203. The third hypervisor 230 may receive copied pages from the first hypervisor 210 and/or the second hypervisor 220.

In an example embodiment, both the first host 201 and the second host 202 additionally have a security key. The security key is sent, by the second host 202, to the third host 203 when the mapping 189 is sent to the third host 203. In this way, responsive to sending the security key from the third host 203 to the source host (e.g., the first host 201 or the second host 202), the hypervisor (e.g., 210 or 220) allows the required page to be copied from the source host (e.g., 201 or 202) to the third host 203. Without providing the security key, the third hypervisor 230 is unable to receive the required page, thus preventing unauthorized copy scenarios.

By utilizing the mapping 189, the third hypervisor 230 receiving the required page, directly from the source host at the third host, prevents additional chained migration (e.g., first host 201 to second host 202 to third host 203) and improves latency. Illustrative examples are useful to explain how copying pages in this manner avoids additional chained migration.

Figure 4A:
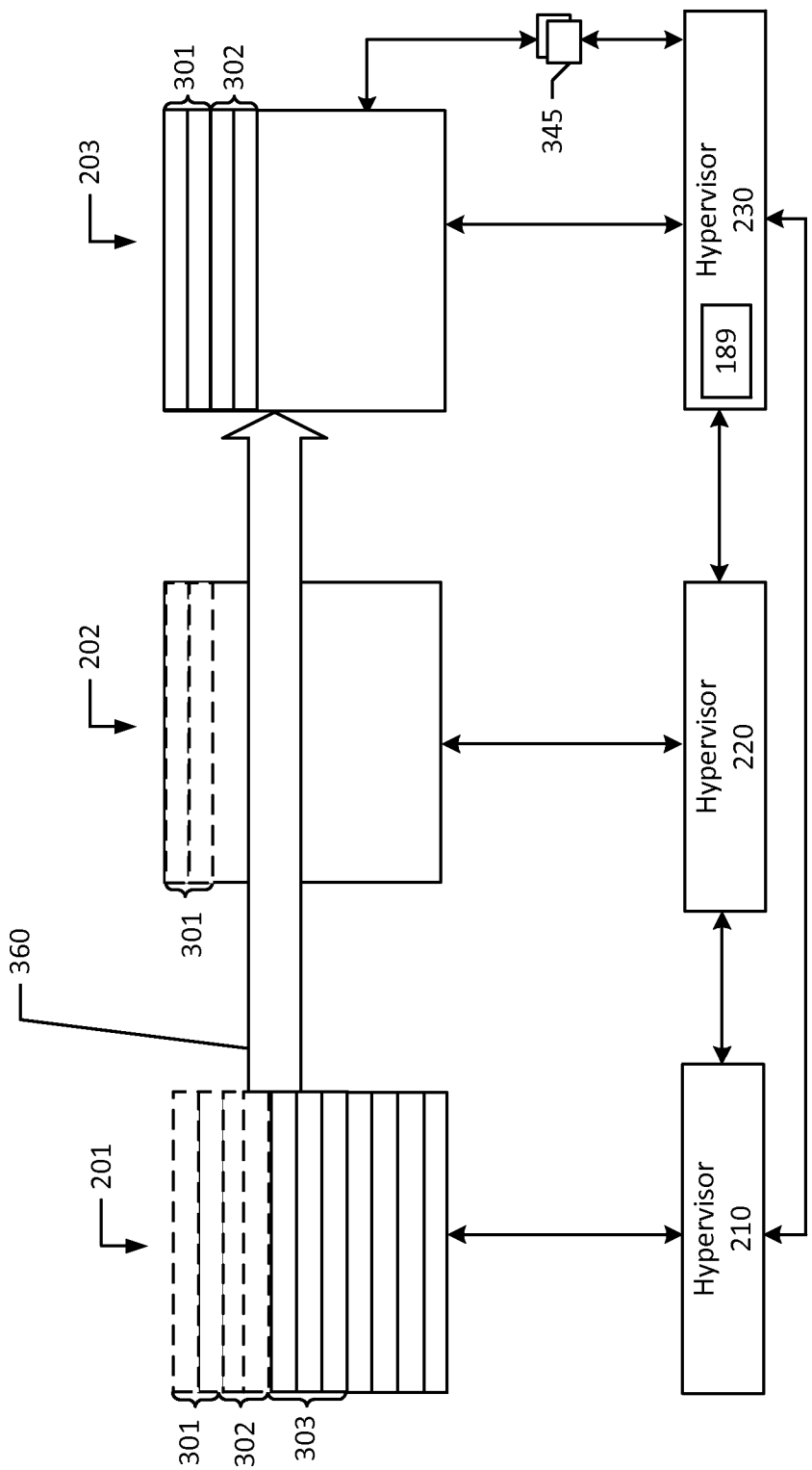
FIG. 4A illustrates a block diagram of a virtual machine migration utilizing a mapping according to an example embodiment of the present disclosure.

FIG. 4A illustrates a block diagram of a virtual machine migration utilizing a mapping according to an example embodiment of the present disclosure. As previously shown in FIG. 3, the first plurality of pages 301 have already been copied from the first host 201 to the second host 202 and from the second host 202 to the third host 203 (e.g., chained migration). For example, the third host 203 has already received a mapping 189, sent from the second host 202. The third hypervisor 230 has already detected a page fault 345, the page fault 345 being associated with a required page that is absent from the third host. In this example embodiment, the required page is in the second plurality of pages 302.

Responsive to detecting the page fault 345, the third hypervisor 230 queries the mapping 189 to determine a source location of a required page, for example, in the second plurality of pages 302. The third hypervisor 230 identifies a source host for the source location. In this example embodiment, the required page is in the second plurality of pages 302. Therefore, the source host is the first host 201. The third hypervisor 230 then receives 360 the required page in the second plurality of pages 302 from the source host (the first host 201). For example, the first hypervisor 210 in cooperation with the third hypervisor 230 transfers the second plurality of pages 302 to the third host 203. As shown in FIG. 4A, the second plurality of pages 302 are copied 360 directly from the first host 201 (as noted by the dotted lines at the first host 201) to the third host 203 (as noted by the solid lines at the third host 203) without the second plurality of pages 302 being transferred onto the second host 202. The first host 201 may have remaining pages (e.g., the third plurality of pages 303, other pages, etc.) on the first host 201 (as noted by the solid lines at the third host), which may be copied at a later time.

Figure 4B:
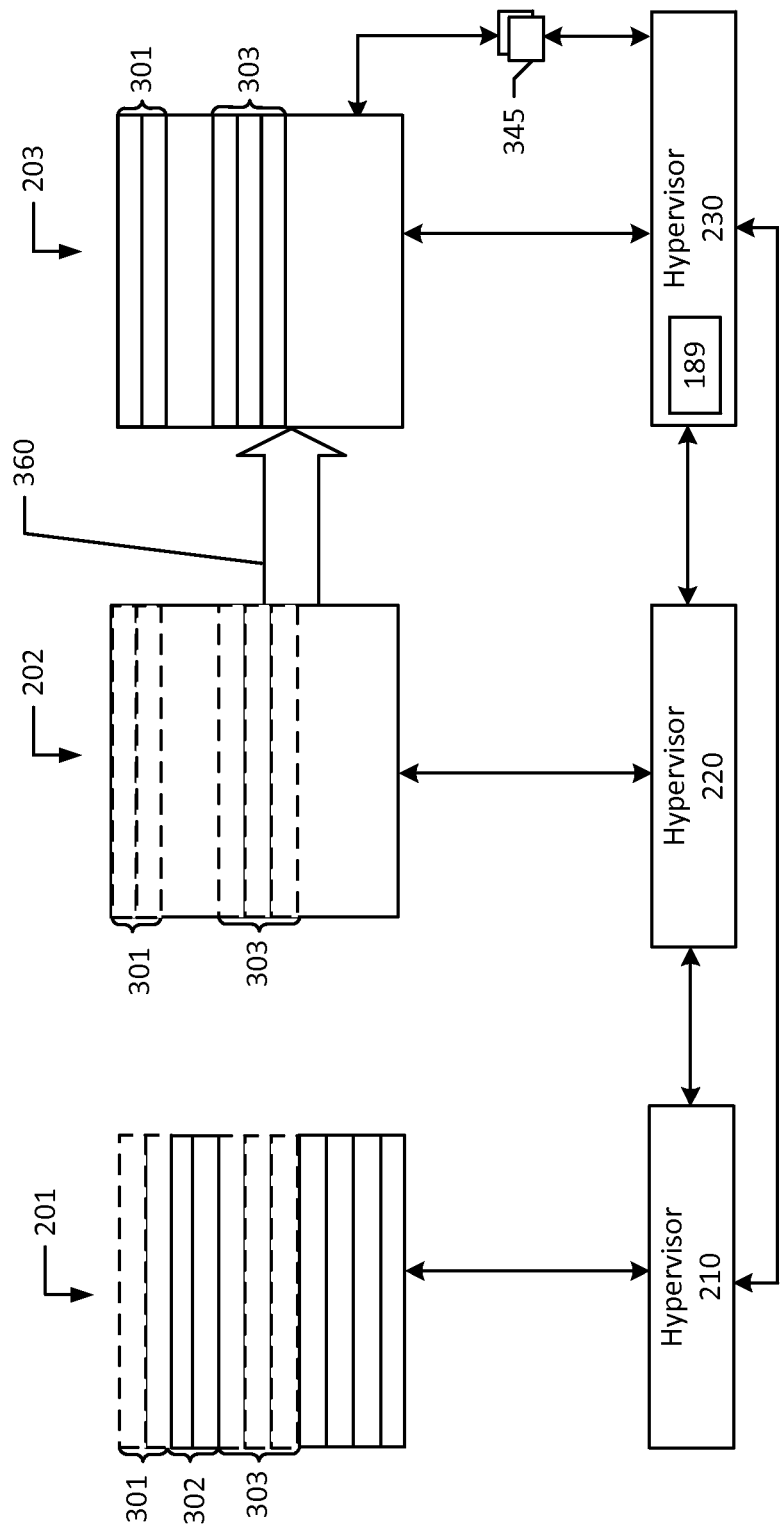
FIG. 4B illustrates a block diagram of an alternate virtual machine migration utilizing a mapping according to an example embodiment of the present disclosure.

FIG. 4B illustrates a block diagram of an alternate virtual machine migration utilizing a mapping according to an example embodiment of the present disclosure. As previously shown in FIG. 3, the first plurality of pages 301 have already been copied from the first host 201 to the second host 202 and from the second host 202 to the third host 203 (e.g., chained migration). For example, the third host 203 has already received a mapping 189, sent from the second host 202. The third hypervisor 230 has already detected a page fault 345, the page fault 345 being associated with a required page that is absent from the third host. In this example embodiment, the required page is in the third plurality of pages 303.

Responsive to detecting the page fault 345, the third hypervisor 230 queries the mapping 189 to determine a source location of a required page, for example, in the third plurality of pages 303. The third hypervisor 230 identifies a source host for the source location. In this example embodiment, the required page is in the third plurality of pages 303. Therefore, the source host is the second host 202. The third hypervisor 230 then receives 360 the required page in the third plurality of pages 303 from the source host (the second host 202). For example, the second hypervisor 220 in cooperation with the third hypervisor 230 transfers the third plurality of pages 303 to the third host 203. As shown in FIG. 4B, the third plurality of pages 303 are copied 360 directly from the second host 202 (as noted by the dotted lines at the second host 202) to the third host 203 (as noted by the solid lines at the third host 203).

In a related example embodiment, responsive to a plurality of required pages (e.g., in the third plurality of pages 303)

being copied from the first host 201 to the second host 202, an updated mapping 189 is sent from the first host 201 to the third host 203. In this way, the third hypervisor 230 is able to continually have updated and accurate information regarding the source location and source host for any page. For example, if the third host 203 has a mapping 189 that indicates a particular page is on the first host 201, the third hypervisor 230 may attempt to receive the particular page from the first host 201. Meanwhile, the first host 201 has already sent the particular page to the second host 202. Because the particular page is no longer on the first host 201, the first host 201 could respond to the third host 203 with an updated mapping 189, sent by the first hypervisor 210. The updated mapping 189 would indicate that the particular page is now on the second host 202.

In an example embodiment, before detecting any additional page fault, responsive to receiving a mapping and detecting an initial page fault, a sender (e.g., the first host 201 or the second host 202) initiates an aggressive state transfer. Through aggressive state transfer, the third hypervisor 230 may actively copy pages from the source host (e.g., first host 201 or second host 202) before detecting another page fault 345. For example, for the aggressive state transfer of the second plurality of pages 302, once the third host 203 receives the mapping 189 and detects an initial page fault, the third hypervisor 230 receives the second plurality of pages 302 from the first host 201 at the third host 203 before detecting another page fault 345. Likewise for example, for the aggressive state transfer of the third plurality of pages 303, once the third host 203 receives the mapping 189 and detects an initial page fault, the third hypervisor 230 receives the third plurality of pages 303 from the second host 202 at the third host 203 before detecting another page fault 345.

In a different example embodiment, during copying of the first plurality of pages 301 at the first time, the copying is stopped. The mapping 189 is sent from the second host 202 to the third host 203, at the second time. The mapping 189 indicates the first location of the second plurality of pages 302 and the second location of the third plurality of pages 303. By stopping copying at the first time, to provide the mapping 189 at the second time, the third hypervisor 230 may be able to query the mapping 189 and copy a required page directly from the source host (e.g., the first host 201, the second host 202, etc.) without having to wait for any initial copying from the first host 201 to the second host 202 and without having to update the mapping 189. In this way, a lowest possible latency may advantageously be achieved for the chained migration.

Figure 5:
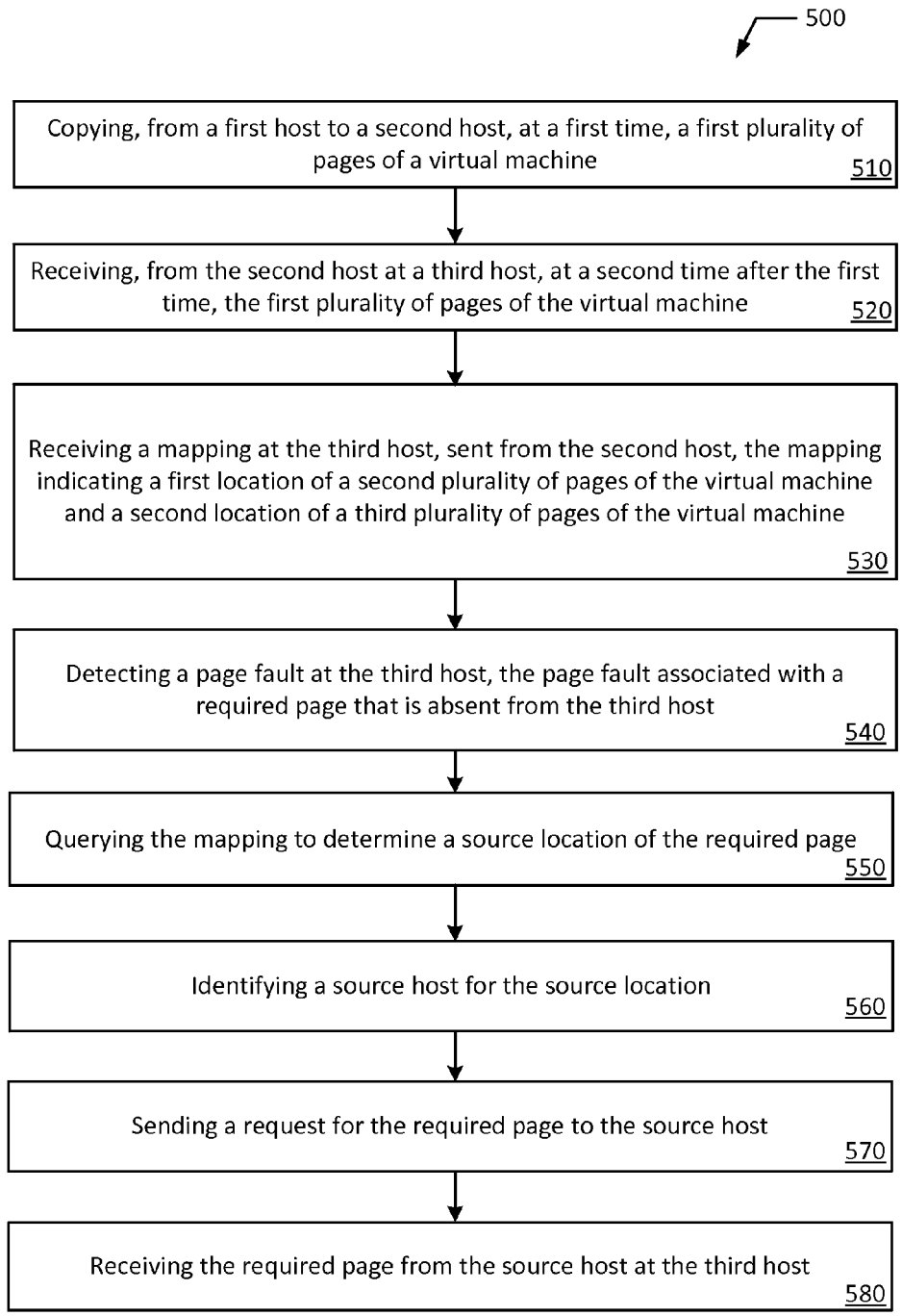
FIG. 5 is a flowchart illustrating an example method for efficient chained post-copy virtual machine migration according to an example embodiment of the present disclosure.

FIG. 5 is a flowchart illustrating an example method for efficient chained post-copy virtual machine migration according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the method is performed by a third hypervisor 230. In an example embodiment, the method is performed on the third host 203.

The example method 500 starts with a first plurality of pages 301 of a virtual machine being copied at a first time from a first host 201 to a second host 202 (block 510). The hypervisor 180 receives, from the second host 202 at a third host 203, at a second time 330 after the first time 310, the first plurality of pages 301 of the virtual machine (block 520). A mapping 189 is received at the third host 203, sent from the second host 202 (block 530). The mapping 189 indicates a first location of a second plurality of pages 302 of the virtual machine and a second location of a third plurality of pages 303 of the virtual machine. In the example embodiment, the first location is a first host 201 and the second location is the second host 202. In an example embodiment, the mapping 189 is sent from the first host 201 and received at the third host 203. The first host 201, the second host 202, and the third host 203, may be distinct and separate computer systems. In an alternate example embodiment, the first location and the second location are at the same computer system (e.g., 100). In another alternate example embodiment, the first location is the second host 202 and the second location is the first host 201. In an additional example embodiment, the mapping 189 further indicates a third location of a fourth plurality of pages of the virtual machine on a fourth host.

The third hypervisor 230 detects a page fault 345 at the third host 203 (block 540). The page fault 345 is associated with a required page that is absent from the third host 203. Responsive to detecting the page fault 345, the third hypervisor 230 queries the mapping 189 to determine a source location of the required page (block 550). The third hypervisor 230 identifies a source host for the source location (block 560). In example embodiments, the source host can be the first host 201 or the second host 202. The third hypervisor 230 then sends, to the source host, a request to retrieve the required page (block 570). For example, the third hypervisor 230 may send a request to copy the required page that includes a security key to allow the required page to be copied form the source host. The third hypervisor 230 then receives the required page from the source host at the third host 203 (block 580). For example, the first hypervisor 210 and/or the second hypervisor 220, in cooperation with the third hypervisor 230, transfers the required page to the third host 203.

In an example embodiment, a device (e.g., hardware device 150A) requires certain pages (e.g., a required page or pages) in order to function. The required page(s) may be all of, or a subset of, the second plurality of pages 302, the third plurality of pages 303, or some other plurality of pages. The device may be unable to proceed with necessary operations until all of the required pages are at the appropriate location (e.g., the third host 203). When the mapping 189 for the second plurality of pages 302 and the third plurality of pages 303 has been provided, the third hypervisor 230 may be able to receive the required page before the device attempts to access the required page. Using the presently disclosed method of post-copy virtual machine migration, the device will typically receive access to most pages it requires with minimal delay. Because the required page is copied directly, from the source host to the third host, the third hypervisor 230, any related additional components, nodes, virtual machines, etc. (e.g., the guest 196A of the virtual machine 170A), may rarely experience a page absence (e.g., the device may rarely attempt to access a page that does not exist on the third host). This may be referred to as active migration of pages. Advantageously, because this migration is direct, from the source host to the third host, any delay in chained migration is significantly reduced.

Active migration of a required page (e.g., in the second plurality of pages 302) may be preferable because the device may rarely experience any significant page absence(s). Typically, devices do not trigger or tolerate page faults; and, typically, hypervisors are not able to detect which memory is accessed (or access attempts) by a device. Thus, using the presently disclosed method of active migration, the hypervisor may advantageously expedite migration as required for optimal performance of the device. By minimizing the chance that the device will experience a scenario where it attempts to access memory at the third host 203 that does not exist at the third host 203 (e.g., pages that have not already been received by the third hypervisor 230), and by receiving the required page directly from the source host at the third host 203, performance is significantly improved.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method of virtual machine migration includes receiving, from a second host at a third host, at a second time after a first time, a first plurality pages of a virtual machine, where the first plurality of pages of the virtual machine were copied at the first time from a first host to the second host. The method of virtual machine migration further includes receiving a mapping at the third host, sent from the second host, where the mapping indicates a first location of a second plurality of pages of the virtual machine and a second location of a third plurality of pages of the virtual machine. The method of virtual machine migration further includes detecting a page fault at the third host, where the page fault is associated with a required page that is absent from the third host. Responsive to detecting a page fault, the method of virtual machine migration further includes querying the mapping, to determine a source location of the required page, and identifying a source host for the source location. The method of virtual machine migration further includes receiving the required page, from the source host at the third host.

In accordance with another example aspect of the present disclosure, which may be used in combination with any one or more of the preceding aspects, the method of virtual machine migration further includes, responsive to receiving the mapping at the third host, copying the second plurality of pages of the virtual machine, from the first host to the third host.

In accordance with another example aspect of the present disclosure, which may be used in combination with any one or more of the preceding aspects, the mapping further indicates a third location of a fourth plurality of pages of the virtual machine on a fourth host.

In accordance with another example aspect of the present disclosure, which may be used in combination with any one or more of the preceding aspects, the first host and the second host have a security key, and the security key is sent, by the second host, to the third host, such that responsive to sending the security key from the third host to the source host, the required page is sent from the source host to the third host.

In accordance with another example aspect of the present disclosure, which may be used in combination with any one or more of the preceding aspects, the source host is the first host.

In accordance with another example aspect of the present disclosure, which may be used in combination with any one or more of the preceding aspects, the source host is the second host.

In accordance with another example aspect of the present disclosure, which may be used in combination with any one or more of the preceding aspects, at least a portion of the second plurality of pages of the virtual machine are copied from the first host to the second host, such that an updated mapping is received at the third host, sent from the first host.

In accordance with another example aspect of the present disclosure, which may be used in combination with any one or more of the preceding aspects, the page fault is generated in response to an attempt to access, on the third host, at least one byte of the required page.

In accordance with another example aspect of the present disclosure, which may be used in combination with any one or more of the preceding aspects, the method of virtual machine migration further includes, during copying of the first plurality of pages of the virtual machine at the first time: stopping the copying of the first plurality of pages of the virtual machine and sending the mapping from the second host to the third host at the second time, where the mapping indicates the first location of the second plurality of pages of the virtual machine and the second location of the third plurality of pages of the virtual machine.

In a second example aspect of the present disclosure, a system for virtual machine migration includes a memory, one or more processors, in communication with the memory, a virtual machine, configured to execute on the one or more processors, where the virtual machine is distributed on a first host, a second host, and a third host, and a hypervisor. The hypervisor, configured to execute on the one or more processors, receives, from the second host at the third host, at a second time after a first time, a first plurality pages of a virtual machine, where the first plurality of pages of the virtual machine were copied at the first time from the first host to the second host. The hypervisor receives a mapping at the third host, sent from the second host, where the mapping indicates a first location of a second plurality of pages of the virtual machine and a second location of a third plurality of pages of the virtual machine. The hypervisor detects a page fault at the third host, where the page fault is associated with a required page that is absent from the third host. Responsive to detecting a page fault, the hypervisor queries the mapping, to determine a source location of the required page, and identifies a source host for the source location. The hypervisor receives the required page, from the source host at the third host.

In accordance with another example aspect of the present disclosure, which may be used in combination with any one or more of the preceding aspects, the system further includes a second hypervisor on the first host, and a third hypervisor on the second host, where one of the second hypervisor and the third hypervisor send the required page to the third host.

In accordance with another example aspect of the present disclosure, which may be used in combination with any one or more of the preceding aspects, responsive to receiving the mapping at the third host, the second plurality of pages of the virtual machine are copied, from the first host to the third host.

In accordance with another example aspect of the present disclosure, which may be used in combination with any one or more of the preceding aspects, the mapping further indicates a third location of a fourth plurality of pages of the virtual machine on a fourth host.

In accordance with another example aspect of the present disclosure, which may be used in combination with any one or more of the preceding aspects, the first host and the second host have a security key, and the security key is sent, by the second host, to the third host, such that responsive to sending the security key from the third host to the source host, the required page is sent from the source host to the third host.

In accordance with another example aspect of the present disclosure, which may be used in combination with any one or more of the preceding aspects, the source host is the first host.

In accordance with another example aspect of the present disclosure, which may be used in combination with any one or more of the preceding aspects, the source host is the second host.

In accordance with another example aspect of the present disclosure, which may be used in combination with any one or more of the preceding aspects, at least a portion of the second plurality of pages of the virtual machine are copied from the first host to the second host, such that an updated mapping is received at the third host, sent from the first host.

In accordance with another example aspect of the present disclosure, which may be used in combination with any one or more of the preceding aspects, the page fault is generated in response to an attempt to access, on the third host, at least one byte of the required page.

In accordance with another example aspect of the present disclosure, which may be used in combination with any one or more of the preceding aspects, during copying of the first plurality of pages of the virtual machine at the first time: stopping the copying of the first plurality of pages of the virtual machine and sending the mapping from the second host to the third host at the second time, where the mapping indicates the first location of the second plurality of pages of the virtual machine and the second location of the third plurality of pages of the virtual machine.

In a third example aspect of the present disclosure, a computer non-transitory storage medium includes executable instructions that, when executed by a computer system, cause the computer system to receive, from a second host at a third host, at a second time after a first time, a first plurality pages of a virtual machine, where the first plurality of pages of the virtual machine were copied at the first time from a first host to the second host. The instructions further cause the computer to receive a mapping at the third host, sent from the second host, where the mapping indicates a first location of a second plurality of pages of the virtual machine and a second location of a third plurality of pages of the virtual machine. The instructions further cause the computer to detect a page fault at the third host, where the page fault is associated with a required page that is absent from the third host. Responsive to detecting a page fault, the instructions further cause the computer to query the mapping, to determine a source location of the required page, and identify a source host for the source location. The instructions further cause the computer to receive the required page, from the source host at the third host.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of virtual machine migration, the method comprising:
   receiving, from a second host at a third host, at a second time after a first time, a first plurality pages of a virtual machine, wherein the first plurality of pages of the virtual machine were copied at the first time from a first host to the second host;
   receiving a mapping at the third host, sent from the second host, wherein the mapping indicates a first location of a second plurality of pages of the virtual machine and a second location of a third plurality of pages of the virtual machine;
   detecting a page fault at the third host, wherein the page fault is associated with a required page that is absent from the third host;
   responsive to detecting a page fault:
   querying the mapping, to determine a source location of the required page;
   identifying a source host for the source location; and
   receiving the required page, from the source host at the third host.

2. The method of claim 1, wherein, responsive to receiving the mapping at the third host, copying the second plurality of pages of the virtual machine, from the first host to the third host.

3. The method of claim 1, wherein the mapping further indicates a third location of a fourth plurality of pages of the virtual machine on a fourth host.

4. The method of claim 1, wherein the first host and the second host have a security key, and the security key is sent, by the second host, to the third host, such that responsive to sending the security key from the third host to the source host, the required page is sent from the source host to the third host.

5. The method of claim 1, wherein the source host is the first host.

6. The method of claim 1, wherein the source host is the second host.

7. The method of claim 1, wherein at least a portion of the second plurality of pages of the virtual machine are copied from the first host to the second host, such that an updated mapping is received at the third host, sent from the first host.

8. The method of claim 1, wherein the page fault is generated in response to an attempt to access, on the third host, at least one byte of the required page.

9. The method of claim 1, further comprising:
   during copying of the first plurality of pages of the virtual machine at the first time, stopping the copying of the first plurality of pages of the virtual machine; and at the second time, sending the mapping from the second host to the third host, wherein the mapping indicates the first location of the second plurality of pages of the virtual machine and the second location of the third plurality of pages of the virtual machine.

10. A system for virtual machine migration, the system comprising:
a memory;
one or more processors, in communication with the memory;
a virtual machine, configured to execute on the one or more processors, wherein the virtual machine is distributed on a first host, a second host, and a third host; and
a hypervisor, wherein the hypervisor is configured to execute on the one or more processors, to:
receive, from the second host at the third host, at a second time after a first time, a first plurality pages of a virtual machine, wherein the first plurality of pages of the virtual machine were copied at the first time from the first host to the second host;
receive a mapping at the third host, sent from the second host, wherein the mapping indicates a first location of a second plurality of pages of the virtual machine and a second location of a third plurality of pages of the virtual machine;
detect a page fault at the third host, wherein the page fault is associated with a required page that is absent from the third host;
responsive to detecting a page fault:
query the mapping, to determine a source location of the required page;
identify a source host for the source location; and
receive the required page, from the source host at the third host.

11. The system of claim 10, further comprising a second hypervisor on the first host, and a third hypervisor on the second host, wherein one of the second hypervisor and the third hypervisor send the required page to the third host.

12. The system of claim 10, wherein, responsive to receiving the mapping at the third host, the second plurality of pages of the virtual machine are copied, from the first host to the third host.

13. The system of claim 10, wherein the mapping further indicates a third location of a fourth plurality of pages of the virtual machine on a fourth host.

14. The system of claim 10, wherein the first host and the second host have a security key, and the security key is sent, by the second host, to the third host, such that responsive to sending the security key from the third host to the source host, the required page is sent from the source host to the third host.

15. The system of claim 10, wherein the source host is the first host.

16. The system of claim 10, wherein the source host is the second host.

17. The system of claim 10, wherein at least a portion of the second plurality of pages of the virtual machine are copied from the first host to the second host, such that an updated mapping is received at the third host, sent from the first host.

18. The system of claim 10, wherein the page fault is generated in response to an attempt to access, on the third host, at least one byte of the required page.

19. The system of claim 10, wherein,
during copying of the first plurality of pages of the virtual machine at the first time, the hypervisor stops the copying of the first plurality of pages of the virtual machine, and
at the second time, the hypervisor sends the mapping from the second host to the third host, wherein the mapping indicates the first location of the second plurality of pages of the virtual machine and the second location of the third plurality of pages of the virtual machine.

20. A computer-readable non-transitory storage medium comprising executable instructions that, when executed by a computer system, cause the computer system to:
receive, from a second host at a first host, at a second time after a first time, a first plurality pages of a virtual machine, wherein the first plurality of pages of the virtual machine were copied at the first time from a first host to the second host;
receive a mapping at the third host, sent from the second host, wherein the mapping indicates a first location of a second plurality of pages of the virtual machine and a second location of a third plurality of pages of the virtual machine;
detect a page fault at the third host, wherein the page fault is associated with a required page that is absent from the third host;
responsive to detecting a page fault:
query the mapping, to determine a source location of the required page;
identify a source host for the source location; and
receive the required page, from the source host at the third host.

* * * * *